United States Patent [19]

Hayata

[11] Patent Number: 4,898,508
[45] Date of Patent: Feb. 6, 1990

[54] LOW SLUNG SMALL VEHICLE

[75] Inventor: Osamu Hayata, Iwata, Japan

[73] Assignee: Yamaha Hatsudoki Kabushiki Kaisha, Iwata, Japan

[21] Appl. No.: 68,231

[22] Filed: Jun. 30, 1987

[30] Foreign Application Priority Data

Jun. 30, 1986 [JP] Japan .................. 61-151424

[51] Int. Cl.⁴ .................................. B62K 15/00
[52] U.S. Cl. .................. 414/476; 414/469; 414/921; 414/495; 414/482; 180/210; 180/217
[58] Field of Search ............. 414/495, 474, 475, 476, 414/480, 482, 537; 180/209, 210, 211, 217, 212; 280/43.17, 43.23

[56] References Cited

U.S. PATENT DOCUMENTS

| | | | |
|---|---|---|---|
| 3,180,510 | 4/1965 | Moller | 414/476 |
| 3,233,767 | 2/1966 | Goodacre | 414/495 |
| 3,512,599 | 5/1970 | Hott et al. | 180/217 |
| 3,866,935 | 2/1975 | Nelson | 414/476 X |
| 3,921,740 | 11/1975 | Forster | |
| 4,237,995 | 12/1980 | Pivar | 180/217 X |
| 4,461,609 | 7/1984 | Zinno | 414/921 X |
| 4,482,284 | 11/1984 | Robbins et al. | 414/921 X |
| 4,516,648 | 5/1985 | Berger et al. | 180/210 X |
| 4,518,057 | 5/1985 | McCallum | 180/210 |
| 4,520,893 | 6/1985 | Keough | 410/7 X |

FOREIGN PATENT DOCUMENTS

| | | | |
|---|---|---|---|
| 539184 | 10/1956 | Fed. Rep. of Germany | 414/482 |
| 2628736 | 1/1977 | Fed. Rep. of Germany | 414/921 |
| 2499001 | 8/1982 | France | 414/469 |

*Primary Examiner*—Frank E. Werner
*Attorney, Agent, or Firm*—Ernest A. Beutler

[57] ABSTRACT

A number of embodiments of low, stable, self-propelled vehicles adapted to carry disabled, infirmed or elderly persons. In each embodiment there is provided a load carrying floor that has its upper surface spaced below the axis of rotation of the rear wheels and which may be raised or lowered for facilitating entry onto the floor. In many embodiments, a wheelchair is adapted to be supported on the floor and a movable stop pivots upon movement of the floor between a raised and a lowered position. In each position, the stop functions to retain a wheelchair in place.

17 Claims, 11 Drawing Sheets

LOW SLUNG SMALL VEHICLE

BACKGROUND OF THE INVENTION

This invention relates to a low slung small vehicle and more particularly to a self-propelled vehicle that may be used by the infirmed, disabled or aged.

A wide variety of people have their mobility impaired by either infirmity, disability or age. Specifically, these individuals are not able to walk or their walking ability is such that they cannot remain standing or walk for long periods of time or distances. As a result, the quality of their life is substantially diminished.

It is, therefore, a principle object of this invention to provide an improved, self-propelled vehicle that can be utilized by an individual to increase his mobility.

It is a further object of this invention to provide an improved, small vehicle that can be used by a person and which is easily operated and which offers a high degree of stability.

It is a further object of this invention to provide a vehicle for use by persons which is easy to enter.

Many individuals who have disabilities with their legs or lower extremities are confined to a wheelchair. These individuals have their mobility even further reduced due to their confinement to such wheelchairs.

It is, therefore, a still further object of this invention to provide an improved lightweight, easily maneuverable and stable vehicle that is adapted to transport a person seated in a wheelchair.

It is a further object of this invention to provide an improved vehicle for transporting a person in a wheelchair in which the person may easily load the wheelchair onto the vehicle.

It is a further object of this invention to provide such a vehicle with an arrangement for ensuring that the wheelchair cannot become displaced from the vehicle.

It is a further object of the invention to provide a vehicle for transporting a person in a wheelchair wherein the wheelchair may be easily loaded onto the vehicle but wherein it will be ensured that the wheelchair cannot inadvertently become displaced from the vehicle.

SUMMARY OF THE INVENTION

A first feature of the invention is adapted to be embodied in a vehicle having a load carrying floor that is suspended from at least a pair of rear wheels and at least one dirigible front wheel. The vehicle has a body that defines a floor which is open at the rear edge of the vehicle. Power means are provided for driving at least one of the rear wheels for propulsion of the vehicle and means suspend the floor for movement relative to the rear wheels from a lowered position wherein the rear edge of the floor is lowered and a raised position.

Other features of the invention are adapted to be embodied in a vehicle having a pair of spaced apart rear wheels, at least one dirigible front wheel and a body that is suspended on the wheels. The body defines a load carrying floor that lies below the axis of rotation of the rear wheels and which is defined by upstanding sidewalls and an upstanding front wall and open at the rear of the vehicle for entry to the load carrying floor.

In accordance with one feature of the invention, a propulsion unit is contained forwardly of the load carrying floor and drive means are incorporated for driving the rear wheels from the propulsion means which drive means is positioned outwardly of the load carrying floor.

In accordance with another feature of the invention, the sidewalls lie below the height of the axis of the main wheels of a wheelchair carried upon the load carrying floor for facilitating a user's manipulation of the wheelchair on the load carrying floor.

In accordance with yet another feature of the invention, a stop is movable from an open position for placing a load upon the floor and a closed position for precluding the load from falling off of the floor.

In accordance with yet another feature of the invention, a pair of links are each pivotally connected to the body and journal a respective one of the rear wheels. Means are provided for pivoting the links relative to the body for raising and lowering the floor relative to the axis of the rear wheels.

In accordance with a still further feature of the invention, the vehicle has only three wheels and the floor has a substantial portion of its load carrying area disposed within a triangle that is defined by the transverse centers of the axes of the wheels.

In accordance with yet another feature of the invention, a seat is carried upon the load carrying floor and is pivotal between a first rearwardly facing position for entry of an occupant through the rear, and a second forwardly facing position for operation of the vehicle by the occupant.

DETAILED DESCRIPTION OF THE PREFERRED EMBODIMENTS OF THE INVENTION

Figure 1:
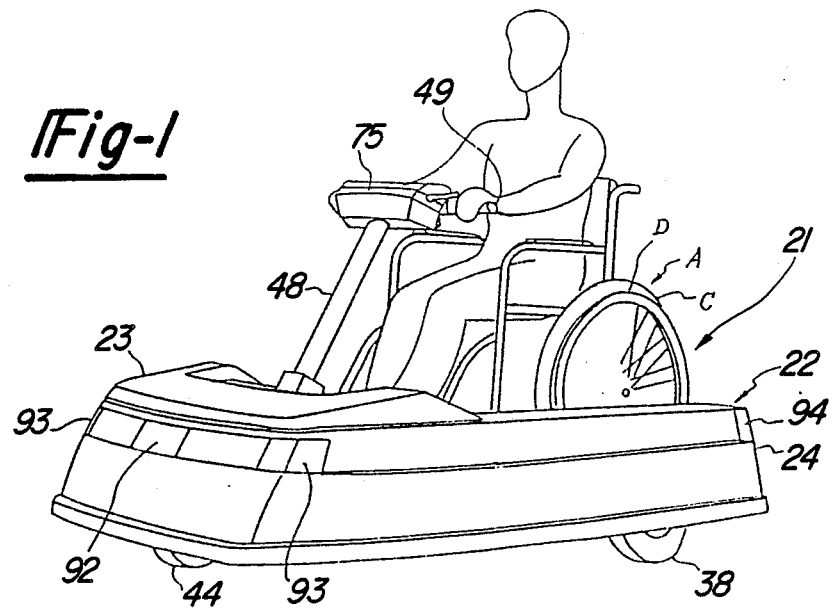
FIG. 1 is a perspective view of a vehicle constructed in accordance with a first embodiment of the invention and showing user seated in a wheelchair carried by the vehicle.
Figure 2:
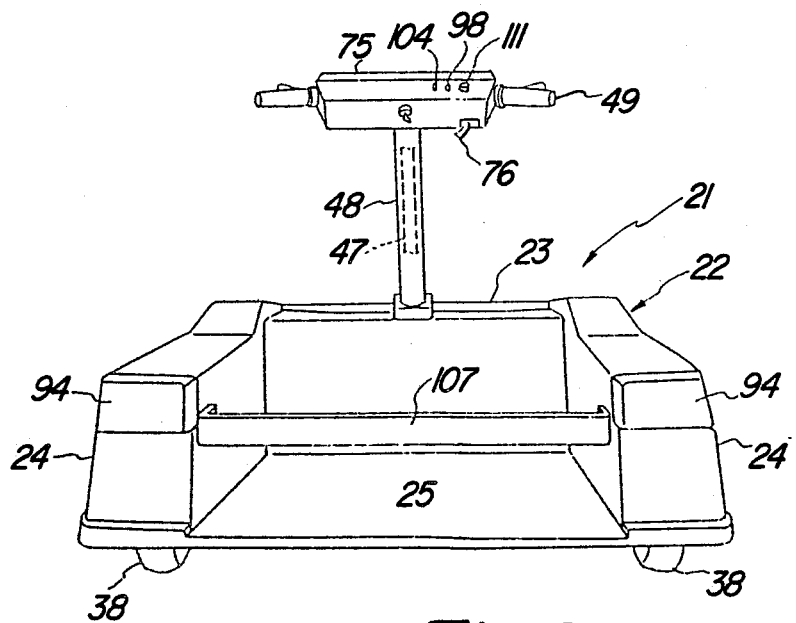
FIG. 2 is a rear perspective view of the vehicle with the wheelchair and occupant removed.
Figure 3:
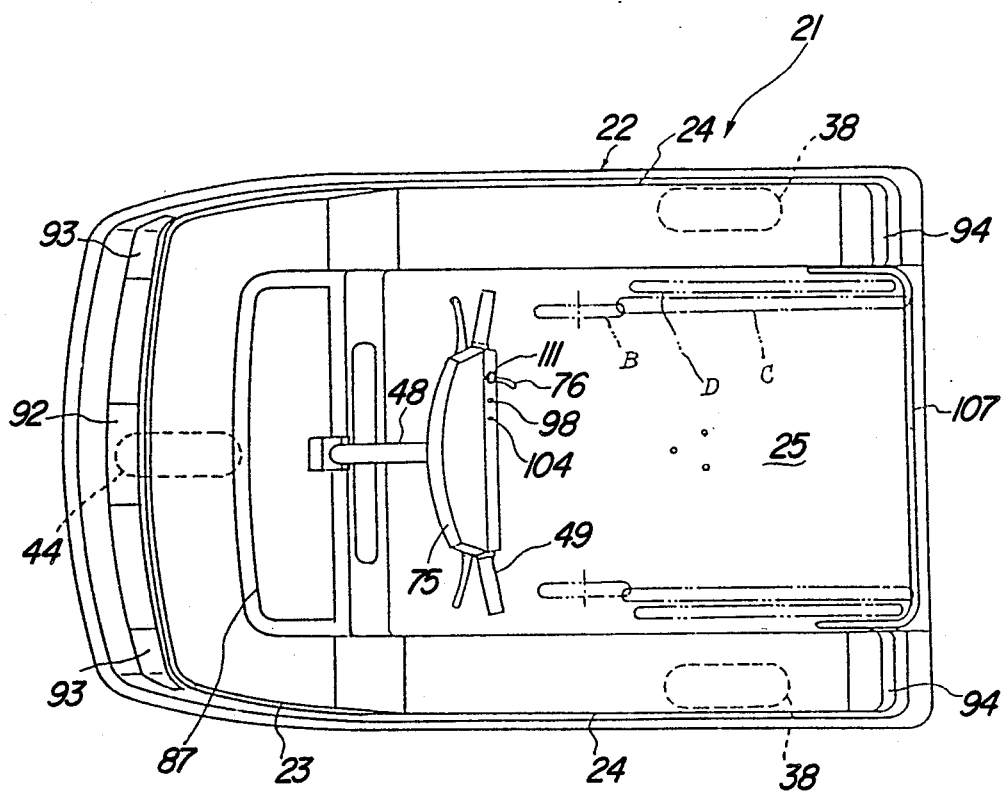
FIG. 3 is a top plan view of the vehicle.

Although a number of embodiments of the invention are illustrated and described, all of these embodiments have substantially the same frame and basic body construction. This basic frame and body construction will be described in detail by particular reference to the first embodiment and to FIGS. 1-5 thereof.

A vehicle constructed in accordance with this embodiment is identified generally by the reference numeral 21 and is designed primarily to give a high degree of mobility to an infirmed, disabled or aged person. The vehicle 21 includes a main body assembly 22 which is formed as either a single or multiple piece from a suitable material such as a molded fiberglass or the like. The body 22 is comprised of a front wall 23 that extends substantially across the front of the vehicle 21. A pair of sidewalls 24 extend rearwardly from the front wall 23. The front wall 23 and sidewalls 24 generally have an inverted box shape so as to provide structural rigidity and also to provide an enclosure for such running components which will be described. A floor 25 is defined between the inner sides of the sidewalls 24 and the rear side of the front wall 23. The floor 25 is opened to the rear of the vehicle.

Figure 4:
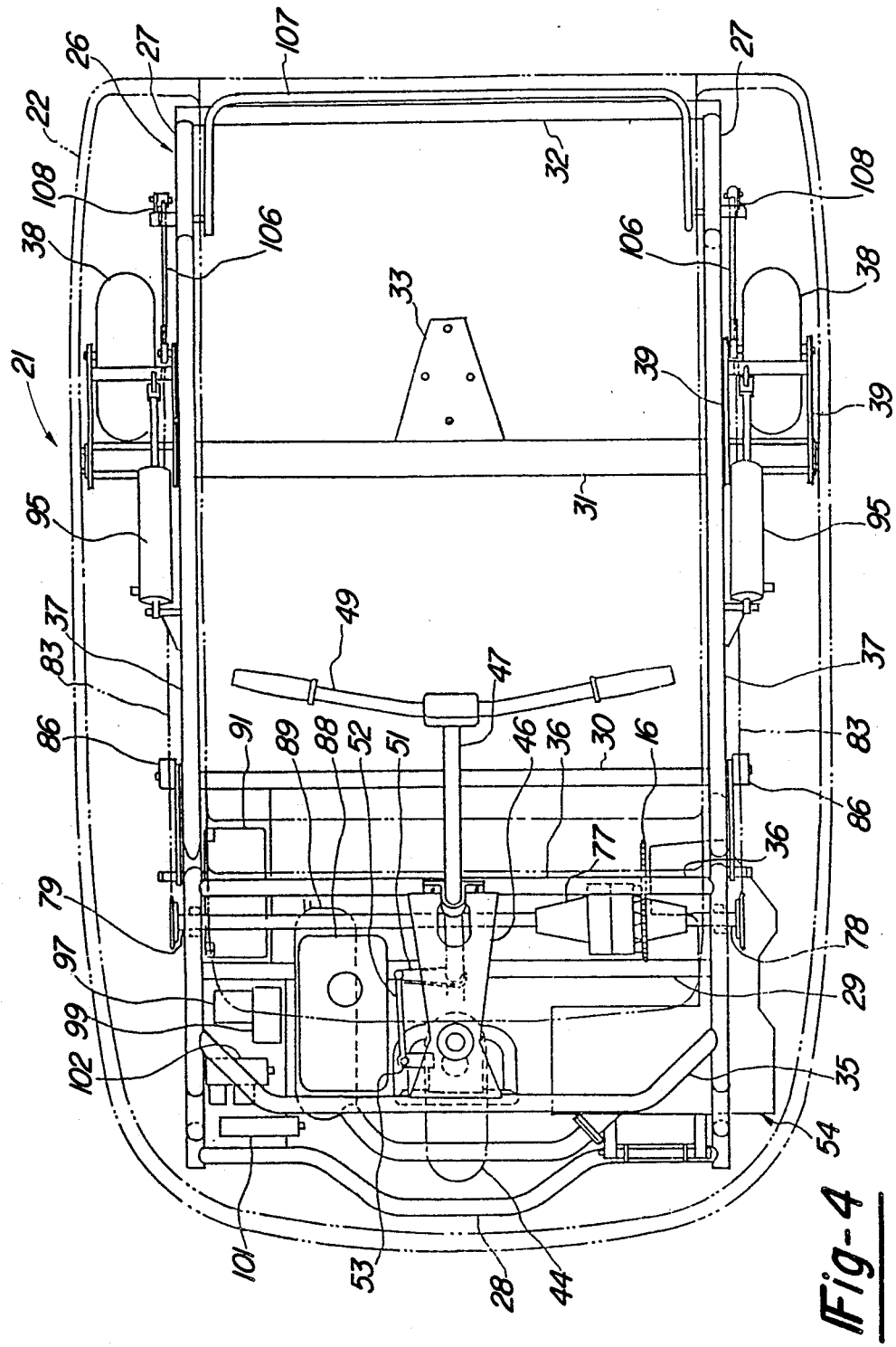
FIG. 4 is an enlarged top plan view showing the vehicle with the body illustrated in phantom to show more clearly the details of construction of the running gear.
Figure 5:
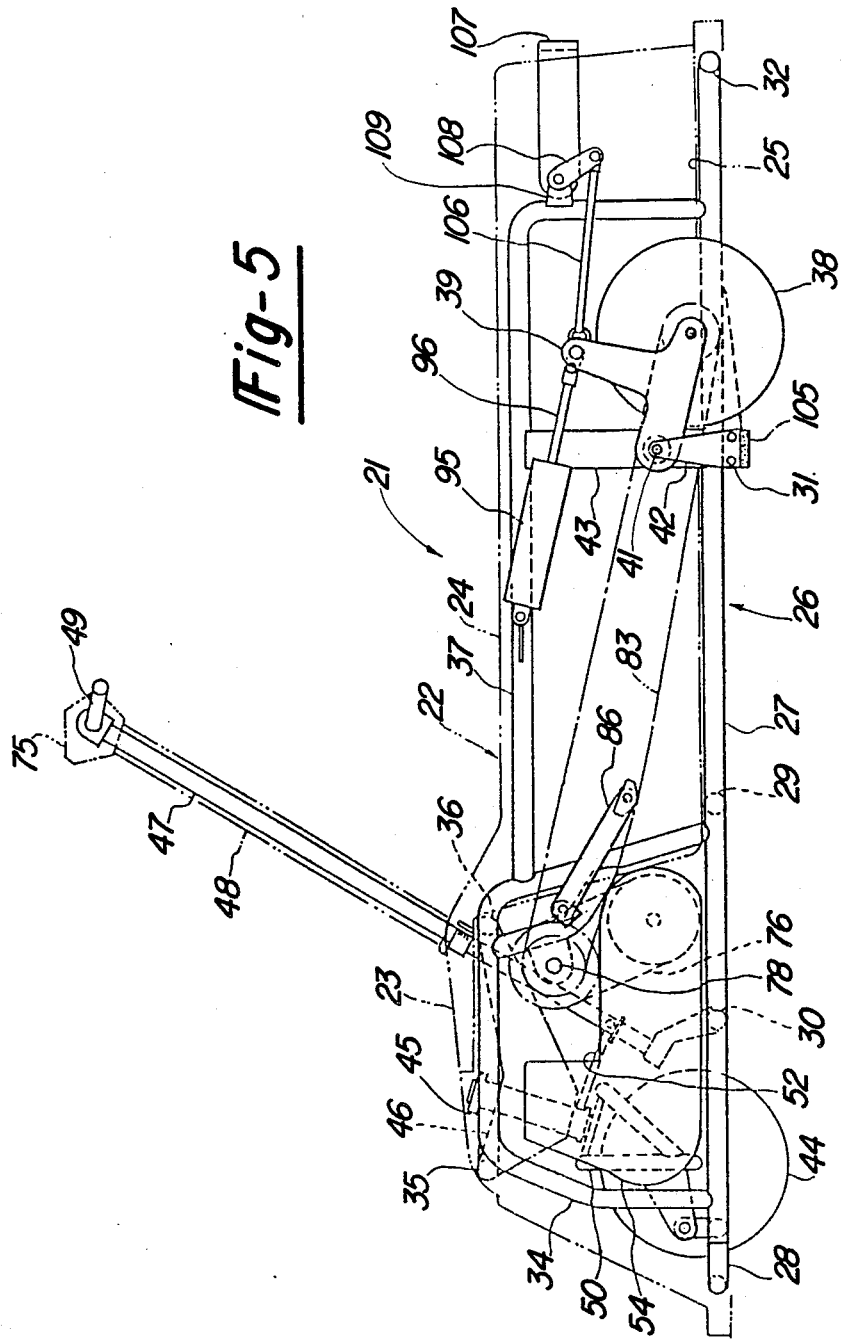
FIG. 5 is a side elevational view of the vehicle with the body also shown in phantom.

Referring now in detail primarily to FIGS. 4 and 5, the vehicle 21 includes a frame assembly, indicated generally by the reference numeral 26, upon which the body 22 is supported. The frame assembly 26 is of the welded up type and is made up of a plurality of tubes including a pair of lower side tubes 27 that are contained within the body sides 24. Extending between and affixed to the lower side tubes 27 are a plurality of cross members including a front cross member 28, intermediate cross members 29, 30 and 31, and a rear cross member 32. It should be noted that the cross member 31 is generally planar in configuration and underlies and reinforces the floor 25 while the other cross members 28, 30 and 32 are tubular. In addition, a rearwardly extending bracket 33 is affixed to the cross member 31 so as to further support the floor 25 and for another purpose to be described.

A pair of U-shaped upstanding frame tubes 34 are affixed to the forward portion of the side tubes 27 and lie within the front wall 23. The upper ends of the tubes 34 are interconnected by means of cross tubes 35 and 36 so as to add further rigidity to the structure.

A pair of upper side tubes 37 are affixed to the tubes 34 at their front ends and to the lower side tubes 27 at the rear ends and lie within the sidewalls 24.

The vehicle 21 is provided with a pair of rear wheels 38. The rear wheels 38 are each contained within a respective one of the sidewalls 24 and are supported by means of respective pairs of inverted T-shaped links 39. The wheels 38 are rotatably journaled on axles that are affixed to one end of the cross leg of the pairs of T-shaped links 39. The other end of this cross leg of the links 39 is pivotally supported as at 41 on upstanding brackets 42 that are affixed to the frame cross member 31. A reinforcing frame plate 43 extends between the side tubes 27 and 37 in the area of the brackets 42 for further reinforcing. It should be noted that pivotal movement of the links 39 about the pivot axis 41 causes the body 22 and specifically the load carrying floor 25 to be raised or lowered, in a manner which will be described.

Figure 17:
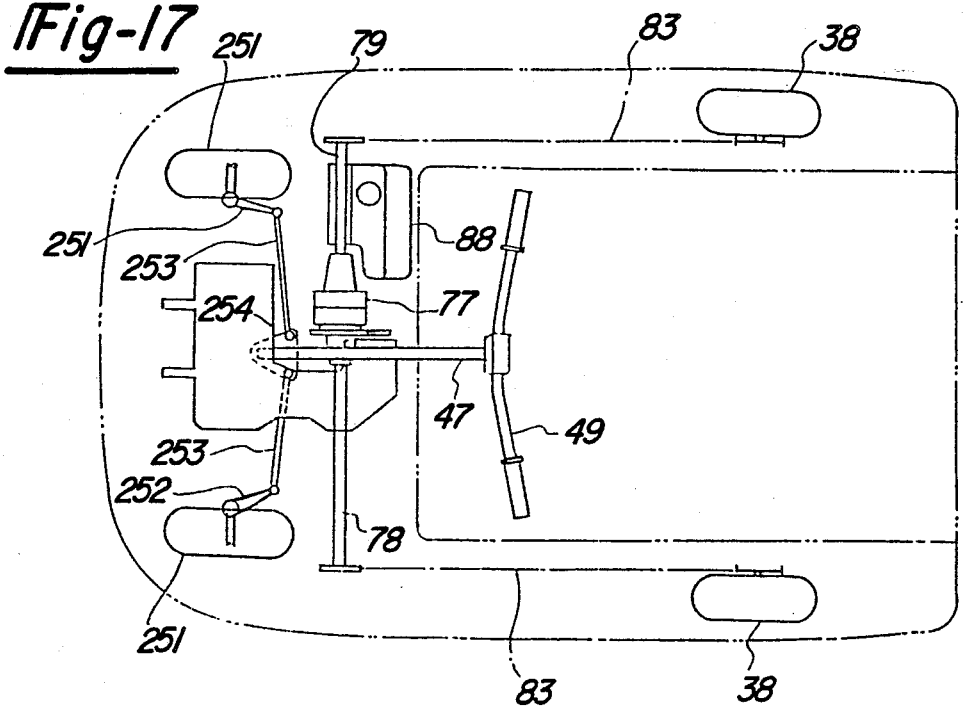
FIG. 17 is a partially schematic top plan view of a vehicle constructed in accordance with yet another embodiment of the invention with the body shown in phantom and the frame structure removed to show more clearly the details of the steering and drive arrangement for the wheels.

All of the illustrated embodiments except for the embodiment of FIG. 17 are three-wheeled vehicles. Thus, in addition to the pair of rear wheels 38 these three-wheeled embodiments include a single front wheel 44 that is dirigibly carried by a front fork 50. The front fork 50 is affixed to the lower end of a steering shaft 45 that is journaled on a subframe assembly 46 that is affixed to the front portion of the frame and specifically the cross member 35.

A steering shaft 47 is also journaled upon the frame assembly 26 by means including a steering mast 48 that extends upwardly from the body and specifically the front wall 31 and cross tube 36 and which carries a handlebar assembly 49 at its upper end for steering of the vehicle by an occupant in a manner to be described. The steering shaft 47 has a pitman arm 51 that is affixed to its lower end and to which is connected a link 52. The opposite end of the link 52 is pivotally connected to an arm 53 that is affixed to the front fork 50 and front steering shaft 45 for steering of the front wheel 46 upon rotation of the handlebar assembly 49.

Figure 7:
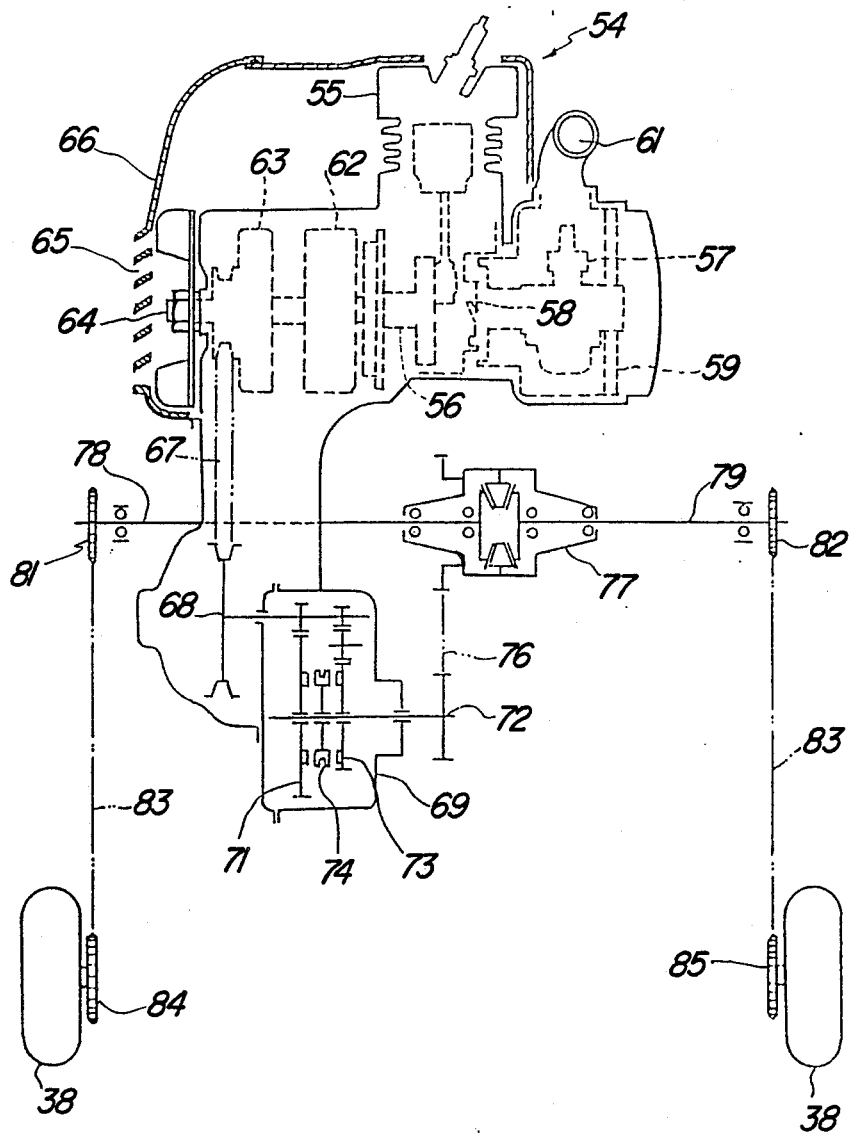
FIG. 7 is an enlarged top plan view showing the propulsion unit of the vehicle.

A propulsion unit indicated generally by the reference numeral 54 is provided for powering the vehicle 21. Although the propulsion unit may be of any known type, in the illustrated embodiment the propulsion unit 54 comprises an internal combustion engine 55 which may be of the two-cycle, single-cylinder type and drives an output shaft 56 (FIG. 7). Alternatively other forms of internal combustion engines or electric motors may be used as propulsion units.

A carburetor 57 supplies a fuel air mixture, in a known manner, to the crankcase of the engine 55 through an induction system which includes a reed-type check valve 58. The carburetor 57 draws filtered air through an air filter having an element 59 which air filter receives atmospheric air through an intake 61.

The engine crankshaft 56 drives a magneto generator 62, a centrifugal clutch 63 and a cooling fan 64. The fan 64 circulates air around the engine 55 which air is drawn through an intake 65 of a cooling shroud 66 that surrounds the engine.

The centrifugal clutch 63 drives a V-belt transmission 67 which, in turn, drives an input shaft 68 of a forward, neutral, reverse transmission 69. The input shaft 68 carries a first pair of meshing gears 71 one of which is affixed to the input shaft 68 and the other of which is rotatably journaled on an output shaft 72. In addition, the input shaft 68 drives a series of three meshing gears 73, the final one of which is journaled upon the output shaft 72. The gears of the gear set 71 and 73 which are journaled on the shaft 72 have dog clutching faces that are adapted to be engaged with a sliding dog clutching element 74 that is disposed between these gears and which is splined for rotation with the output shaft 72. If the operator engages the clutch 74 with the gear set 71, the output shaft 72 will be driven forwardly. If, on the other hand, the operator engages the dog clutching element 74 with the gear set 73, the output shaft 72 will be driven in a reverse direction.

A console 75 is affixed to the handlebar 49 and includes a shift lever 76 that is connected in a suitable manner, as by means of a flexible cable, to the dog clutching element 74 for achieving the aforenoted shifting. Handle grips may be carried by the handlebar assembly 49 and one of them may be rotatable for operating the throttle valve of the carburetor 57 so as to change the speed of running of the engine. Preferably the engine is governed so as to limit the maximum speed of the vehicle 21.

Referring again to FIG. 7, a chain 76 transfers drive from the output shaft 72 to a differential gear assembly 77 which is also contained within the front wall 23. The differential gear assembly 77 drives a pair of shafts 78 and 79 which have affixed to them respective sprockets 81 and 82.

Chains 83 interconnect the sprockets 81 and 82 with corresponding sprockets 84 and 85 that are affixed to the rear wheels 38. Each of the chains 83 extends through a respective one of the body sidewalls 24 so as to conceal the final drive. A tensioner assembly comprised of a pair of pivotally supported tensioner arms 86 engages the chains 83 so as to maintain an appropriate tension upon them.

The power unit 54 and transmission mechanism as thus far described except for the chain 83 and tensioner arms 86 is accessible through a removable panel 87 on the top of the front wall 23. Also accessible through this panel is a fuel tank 88, muffler 89 for the engine exhaust system, and a battery 91. The battery 91 is used to provide power for the engine and is charged by the magneto generator 62 as aforenoted. In addition, the vehicle 21 may be provided with a headlight 92, front side lights 93, and rear tail lights 94 all of which are powered by the battery 91.

The mechanism for activating the T-shaped levers 39 for raising and lowering the load carrying floor 25 is also contained in part in this compartment which is accessible through the removable panel 87.

Figure 6:
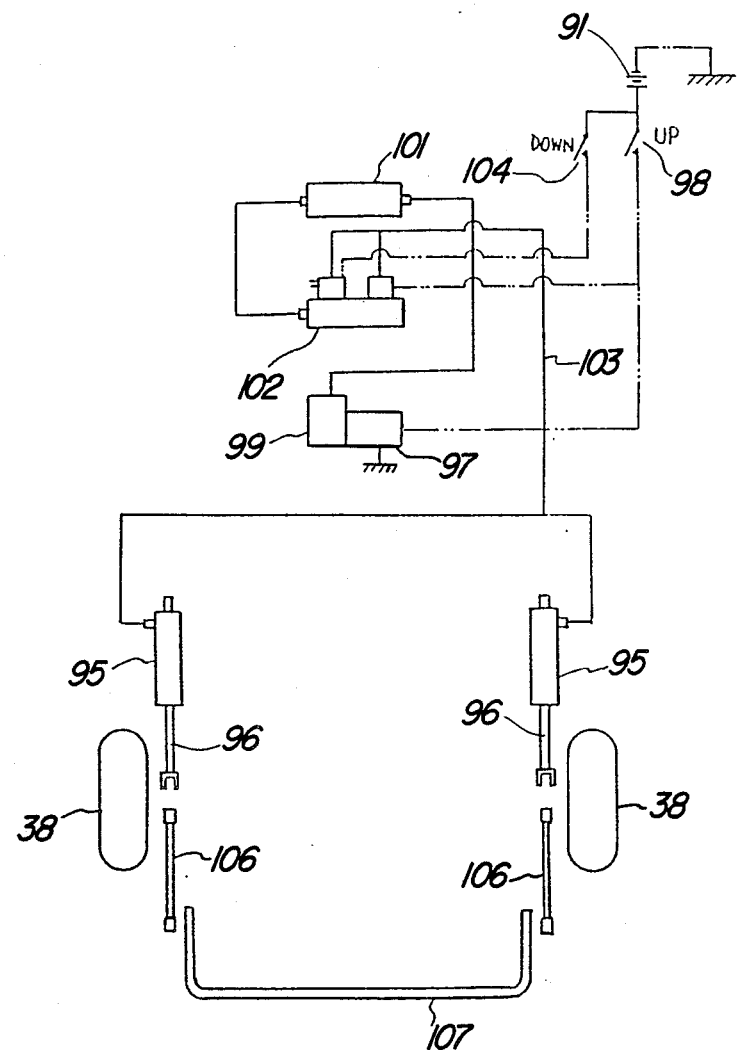
FIG. 6 is a partially schematic view showing the mechanism for raising and lowering the body relative to the rear wheels.

This raising and lowering mechanism is best shown in FIGS. 4 through 6 and is illustrated schematically in this latter figure. The mechanism includes a pair of pneumatic cylinders 95 that are pivotally connected to the frame upper side members 37 at their forward ends. Piston rods 96 of the cylinders 95 are connected by means of trunnions to the long leg of the T-shaped links 39. As a result, expansion or contraction of the piston rods 96 will effect pivotal movement of the links 39 and raising and lowering of the floor 25. It should be noted that the entire body 22 pivots about the rotation axis of the front wheel 44 during this pivotal movement of the links 39.

The operating system for the air cylinders 95 may be best understood by reference to FIG. 6. This system includes an electric motor 97 which is in circuit with the battery 91 through an up or raise switch 98 which switch is mounted on the console 75. The electric motor 97 drives an air pump 99 which supplies pressure through a filter 101 to a changeover valve 102. When the changeover valve 102 is pressurized, air pressure is delivered through a line 103 to the cylinders 95 so as to cause them to expand and pivot the links 39 so that the floor 25 and body 22 will be raised to its normal operative position.

Figure 8:
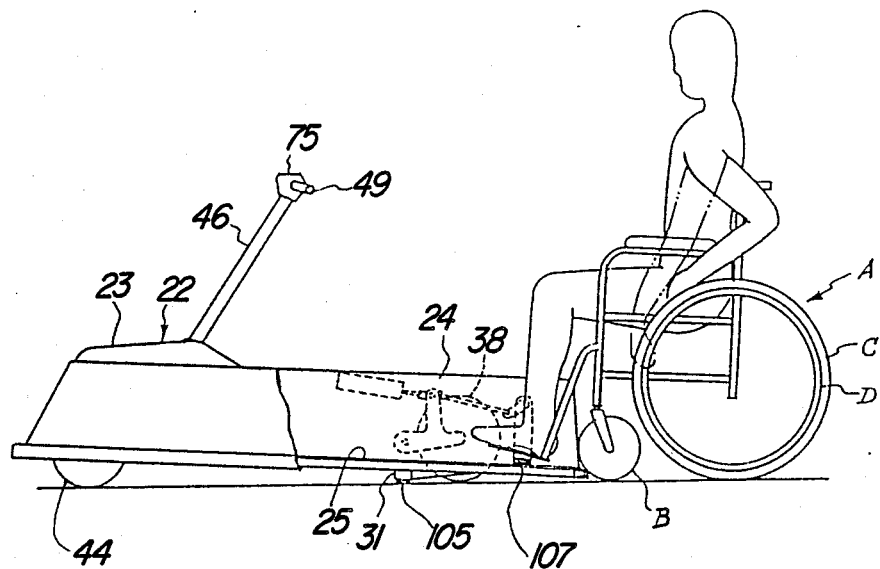
FIG. 8 is a side elevational view showing the manner of loading a wheelchair onto the vehicle.

If it is desired to lower the floor 25 and body 22 for loading, a down switch 104, which is also mounted on the console 75, is activated. This switch causes the changeover valve 102 to be vented to the atmosphere and, accordingly, the weight of the vehicle 21 acting on the links 39 will cause them to pivot in a counterclockwise direction as shown in FIG. 5 so that the vehicle body 22 will lower by pivoting about the axis of the front wheel 44. The body will lower until a stop bar 105 carried on the underside of the frame cross member 31 contacts the ground as may be best seen in FIG. 8. In this condition, a disabled person sitting on a wheelchair may readily roll the wheelchair onto the loading floor 25 as shown in FIG. 8. The stop bar 105 may carry a rubber or other frictional pad to act as a brake on the vehicle 21 in the lowered position.

The linkage systems for the rear wheels 38 are interconnected to each other so that both sides of the body 22 will be raised and lowered simultaneously. In addition, this interconnecting linkage system includes a stop bar for assisting loading and for ensuring that the load on the floor 25 will not inadvertently be displaced when the vehicle 21 is being operated. This linkage system includes a pair of links 106 which are pivotally connected at respective ones of their ends to the levers 39. The opposite ends of the links 106 are pivotally connected to a U-shaped stop bar 107 means of levers 108. The levers 108 are respectively journaled on brackets 109 carried at the rear portion of the frame assembly.

Figure 9:
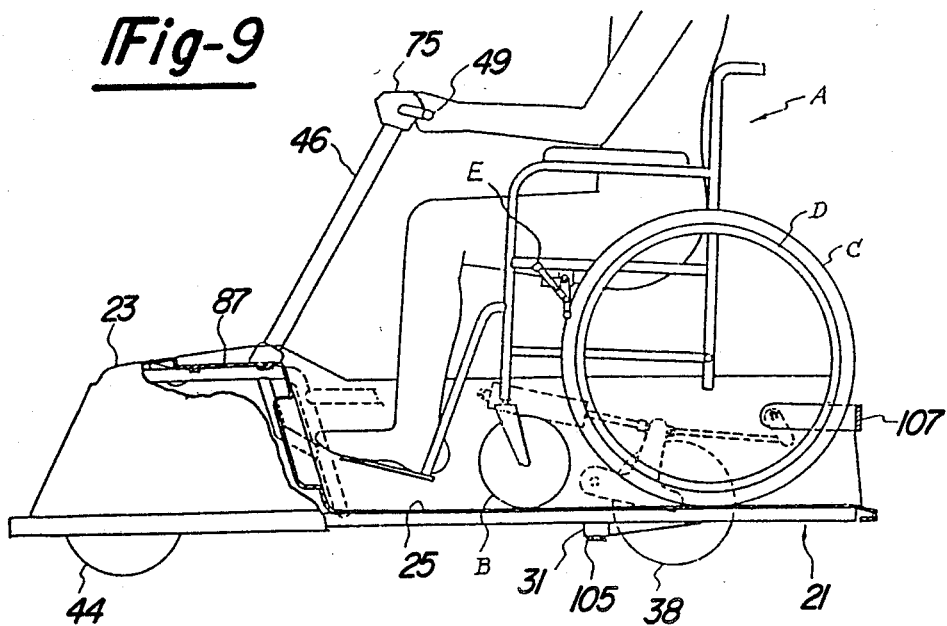
FIG. 9 is an enlarged side elevational view showing the wheelchair when loaded on the vehicle.

As may be seen in FIGS. 5 and 9, when the floor 25 is elevated, the stop bar 107 will be pivoted to a raised position. However, when the links 39 are permitted to pivot to lower the floor 25, the stop bar 107 will rotate about the brackets 109 to a position wherein it overlies the floor 25 as may be best seen in FIG. 5.

Referring now to FIGS. 8 and 9, the loading operation will now be described. Assuming that the operator has actuated the down switch 104 so that the floor 25 will be lowered to the loading position shown in FIG. 8, a person seated in a wheelchair A may conveniently propel the wheelchair A toward the loading floor 25. First, the caster wheels B are rolled onto the floor 25 by the operator rotating the main wheels C through the hand rings D. It should be noted that when the caster wheels B pass over the stop bar 107, the stop bar 107 will function so as to prevent the wheelchair A from rolling backwardly. The operator then may continue to advance the wheelchair onto the floor 25. It should be noted that the tops of the sidewalls 24 are substantially below the axis of rotation of the main wheels C so that the operator's hands on the hand rings D will not interfere with his operation of the chair A. Once the chair is fully loaded onto the floor 25, the engagement of the stop bar 107 with the rear wheels will prevent the wheelchair from rolling backwardly. The operator may also set the wheelchair brake E at this time.

The vehicle is then raised by activating the up switch 98 and the pneumatic cylinders will be operated in the manner previously described so as to raise the body 22 and floor 25. At the same time, the stop bar 107 will be pivoted upwardly so to engage the rear side of the main wheels C and prevent the wheelchair from rolling off of the vehicle when it is operated.

The vehicle engine is started by operating an electrical starter switch 111 carried on the console and then the vehicle can be driven off in an obvious manner.

It should be noted that the configuration is such that the bulk of the load carrying floor 25 lies within a triangle defined by the transverse centers of the axes of the front wheel 44 and rear wheels 38. As such, the vehicle has substantial stability even though it only has three wheels. In addition, the low center of gravity of the vehicle will add to its stability since the floor 25 is disposed below the axis of rotation of the wheels 44 and 38. Hence, even though the user may be disabled, infirmed or aged, his mobility will be substantially increased through the use of this vehicle.

Because of the small size and the fact that the walls 23 and 24 are quite low, the operator will have no difficulty in maneuvering the vehicle even in tight locations. That is, the user will readily be able to see the corners of the vehicle and be able to maneuver it without accident.

The lowness of the floor 25 and the balancing of the configuration and the weight also places a large portion of the weight on the driving rear wheels 38. Thus, it will be easy for an operator to drive up inclines without any loss of traction.

Figure 10:
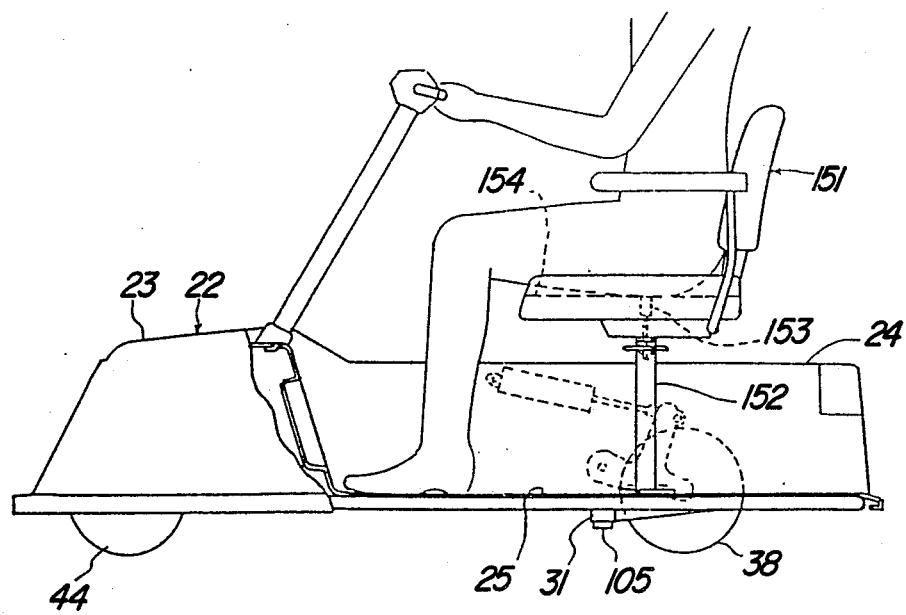
FIG. 10 is a side elevational view of a vehicle constructed in accordance with another embodiment of the invention with the seat of the vehicle fixed in the operative position.
Figure 11:
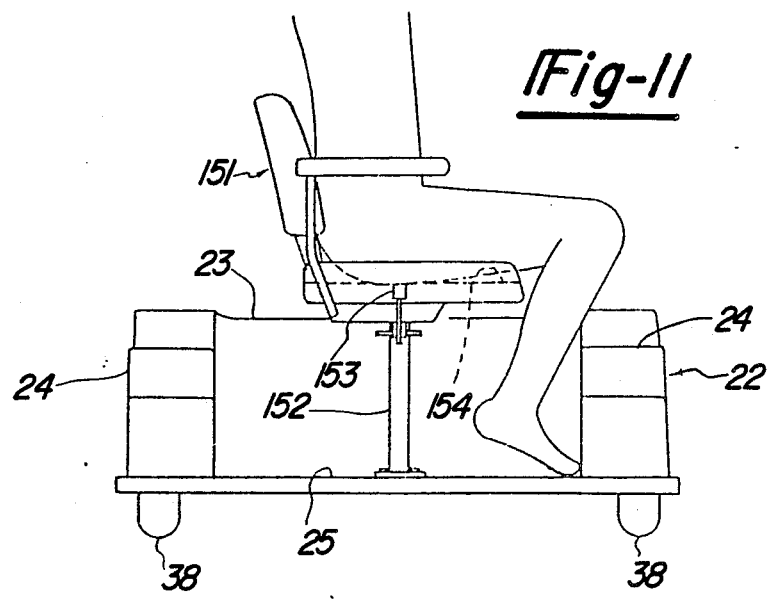
FIG. 11 is a rear elevational view of the vehicle shown in FIG. 10 and illustrates the seat in an intermediate position.
Figure 12:
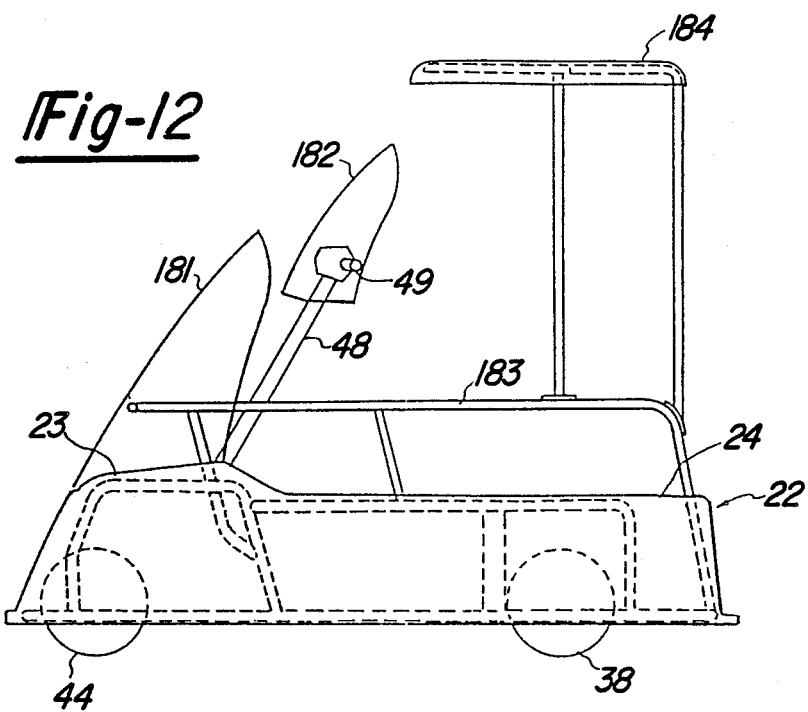
FIG. 12 is a side elevational view of a vehicle constructed in accordance with another embodiment of the invention.

FIGS. 11 and 12 show another embodiment of the invention wherein the aforedescribed vehicle is provided with a seat 151. The seat 151 is carried upon a post 152 that is fixed at its lower end to the frame bracket 33 (FIG. 4). The seat 151 is pivotally supported upon the post 152 and can rotate through 360°. A latch mechanism 153 is incorporated, however, so as to lock the seat 151 in a rearward facing position so that a user may easily enter the seat 151, particularly if the body 22 has been lowered in the manner aforedescribed. Once seated, the user may reach under the seat and release the latch 153 and pivot it through 180° to the forward facing position as shown in FIG. 10. The latch 153 is then reapplied so as to lock the seat in its operating position.

The seat lower portion 154 is inclined slightly and it will be noted that the operator's legs are positioned so that they will not strike the side walls 24 when the seat 151 is rotated from its rearwardly facing position, to a side facing position (FIG. 11) and then forwardly. As a result, the operator will be quite comfortable and obtain the benefits as aforenoted.

Figure 13:
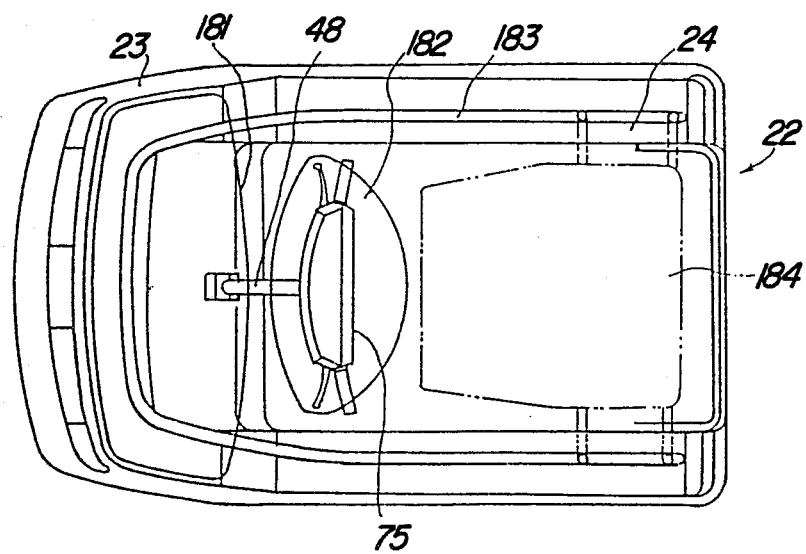
FIG. 13 is a top plan view of the vehicle shown in FIG. 12 with a portion shown in phantom.

FIGS. 12 and 13 show still further accessories which may be used singly or in combination with each other with each of the previously described vehicles. These accessories include a body windshield 181 that is mounted to the front wall 23 and a driver's windshield 182 that is carried by the steering handlebar 49. In addition, there is provided a grab rail 183 that is supported on the sidewalls 24. However, the grab rail 183 is positioned laterally outwardly from the inner edges of the sidewalls 24 so as to be clear of an operator's hands if the operator is operating the hand rings of a wheelchair so as to position the wheelchair on the load carrying floor, as previously described. In addition, a roof or cover 184 may be carried by the grab rail 183 so as to afford shade for the occupant and protection from the weather.

Figure 14:
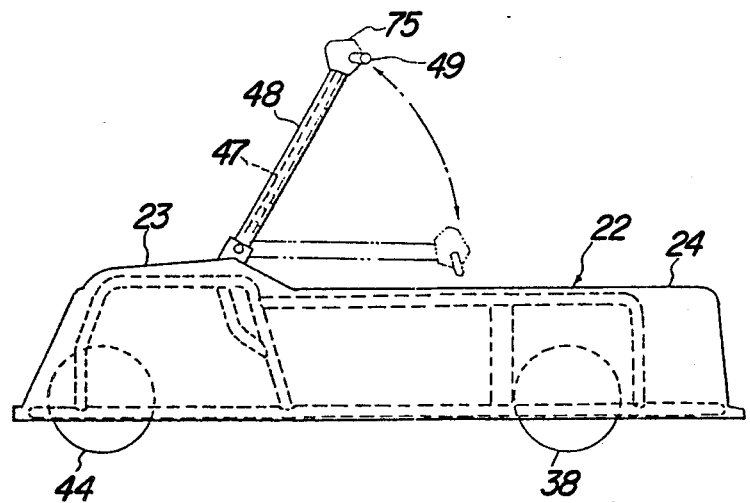
FIG. 14 is a side elevational view of a vehicle constructed in accordance with yet another embodiment of the invention.
Figure 15:
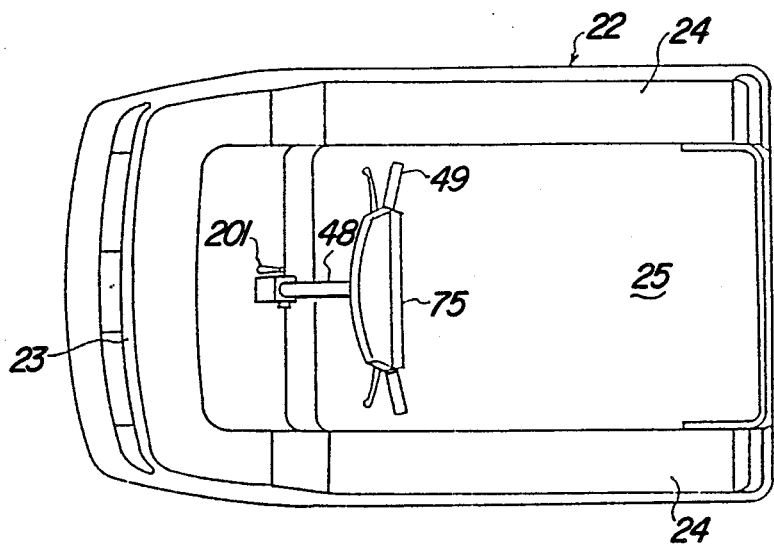
FIG. 15 is a top plan view of the vehicle shown in FIG. 14.

FIGS. 14 and 15 show yet another embodiment of the invention. This embodiment differs from the embodiment of FIGS. 1-9 only in that the steering shaft 47 and its mast 48 are formed of two pieces that are hingedly connected to each other so as to permit folding of the steering mechanism from the upright position as shown in solid-line views to a lowered position as shown in phantom for facilitating storage or transport within a larger vehicle. A locking mechanism 201 is incorporated at the pivotal connection so as to lock the steering mechanism in its operative condition.

Figure 16:
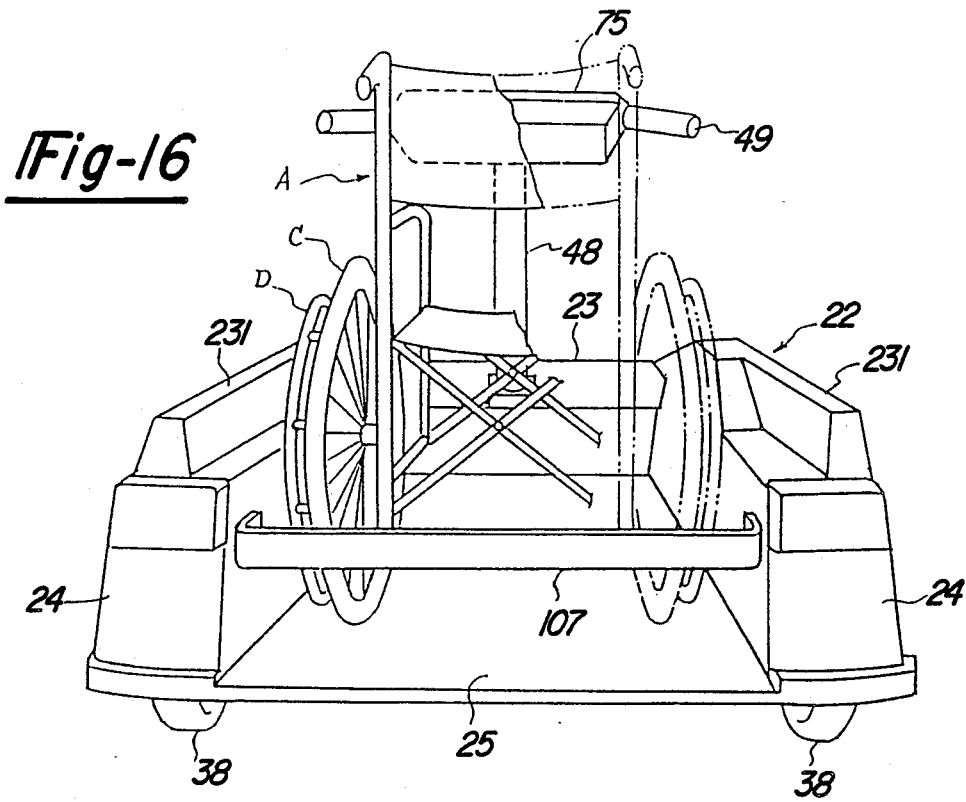
FIG. 16 is a rear perspective view of a vehicle constructed in accordance with yet another embodiment of the invention with a wheelchair in place on the vehicle.

FIG. 16 shows another embodiment which is generally similar to the embodiment of FIGS. 1-9. The only difference is that in this embodiment, the sidewalls 24 are provided with raised outer portions 231 that can function as with the grab rails of the embodiment of FIGS. 12 and 13. However, these raised portions 231 are still positioned laterally outwardly so that they will not interfere with an operator's use of the hand rings D for manipulating the wheelchair A.

In all of the embodiments thus far described, the vehicle has only a single dirigible front wheel. However, as has been noted, the layout of the vehicle is such that it will have a high degree of stability. FIG. 17 shows another embodiment of the invention which is substantially the same as the embodiment of FIGS. 1-9 and, for that reason, components which are the same have been identified by the same reference numerals. However, in this embodiment the vehicle is provided with a pair of front wheels 251. The front wheels 251 journaled on spindles is carried by the frame assembly in any suitable manner. Steering arms 252 extend rearwardly from the spindles and are connected by means of drag links 253 to a pitman arm 254 of the steering column 47. In all other regards, this embodiment is the same as those previously illustrated and described.

It should be readily apparent from the foregoing descriptions that a number of embodiments of the invention have been illustrated and described. Each of these embodiments provides a vehicle that will be readily useable by an infirmed, disabled or aged person so as to substantially increase their mobility. Furthermore, the construction is such that it is highly stable, very maneuverable and will have good traction even when going up steep inclines. Furthermore, the sidewall construction is such that it will not interfere with a user manipulating either a wheelchair onto the loading floor or utilizing the rotatable seat which has been described without interference. Although a number of embodiments of the invention have been illustrated and described, various changes and modifications may be made without departing from the spirit and scope of the invention, as defined by the appended claims.

I claim:

1. A vehicle having a load carrying floor suspended from at least a pair of rear wheels and at lease one dirigible front wheel, a body comprising front walls and side walls, said front walls and said side walls each having a generally inverted box shape and defining said floor and open at the rear edge of said vehicle, said front wheel being supported relative to said body for steering movement about a steering axis and for rotation about a rotational axis, power means fixed relative to said body comprising an engine contained within said front wall and driving transmission means comprising a differential position within said front wall and a pair of chains each driven by an output shaft of said differential and extending through a respective one of said side walls for driving a respective one of said rear wheels for propulsion of said vehicle, and means for suspending said floor for pivotal movement about said rotational axis of said front wheel and for movement relative to said rear wheels from a lowered position wherein said floor is angularly disposed relative to the ground and said front wheel rotational axis of the rear edge of said floor is lowered to a ground engaging position and a raised position wherein said floor extends substantially horizontally and the rear edge thereof is above the ground.

2. A vehicle as set forth in claim 1 further including braking means carried by the body and engageable with the ground when the floor is in its lowered position for precluding movement of said vehicle above the ground.

3. A vehicle as set forth in claim 1 further including stop means adapted to extend across the rear edge of the floor for precluding an article loaded onto the floor from falling off when the vehicle is in its raised position.

4. A vehicle as set forth in claim 3 wherein the stop means is movable from a first position to its operative position extending across the rear edge of the floor in response to movement of the floor between its lowered position and its raised position.

5. A vehicle as set forth in claim 4 wherein the stop means is in overlying relationship to the floor in its first position for acting as a brake over which the wheels of a wheelchair or the like must pass when rolled onto the floor and to retard motion of said wheelchair when rolled thereacross.

6. A vehicle as set forth in claim 1 wherein the inner side surfaces of the sidewalls are positioned below the axles of a wheelchair that is adapted to be carried on the floor.

7. A vehicle as set forth in claim 6 further including grab rails affixed to said sidewalls and extending upwardly therefrom laterally outwardly of the inner side surfaces of said sidewalls.

8. A vehicle as set forth in claim 7 wherein the grab rails are formed by a raised outer section of the sidewalls.

9. A vehicle as set forth in claim 6 further including a roof carried by the grab rails.

10. A vehicle as set forth in claim 1 further including a seat carried by the floor.

11. A vehicle as set forth in claim 10 wherein the seat is pivotal between a rearwardly facing position and a forwardly facing position and the sidewalls are of such a height that they will not interfere with the legs of a person seated on the seat during the pivotal movement from the rearwardly facing position to the forwardly facing position.

12. A vehicle as set forth in claim 1 further including a steering shaft and mast for steering the dirigible wheel.

13. A vehicle as set forth in claim 12 wherein the steering shaft and mast are pivotal between a normal steering position and a lowered position.

14. A vehicle as set forth in claim 1 wherein the means for supporting the floor for movement relative to the rear wheels comprises a pair of links pivotally connected at a first position to the body and rotatably journaling the wheels at about an axis offset from said first pivotal connection.

15. A vehicle as set forth in claim 14 further including means for interconnecting said links for simultaneous pivotal movement.

16. A vehicle as set forth in claim 15 wherein the interconnecting means comprises a stop supported for pivotal movement relative to the body from a retracted position to an operative position extending across the rear edge of the vehicle for precluding an article from falling off the floor.

17. A vehicle as set forth in claim 16 wherein the stop means is juxtaposed to the floor in its retracted position for engagement with the wheel of a wheelchair rolled onto the floor for precluding the wheelchair from rolling off of the floor.

* * * * *